INVENTOR.
L. D. Soubier,
BY Rule & Hoge
ATTORNEYS.

Nov. 7, 1939.  L. D. SOUBIER  2,179,224
ELECTRIC HEATING AND FLOW CONTROL OF MOLTEN GLASS
Filed May 18, 1937  3 Sheets—Sheet 2
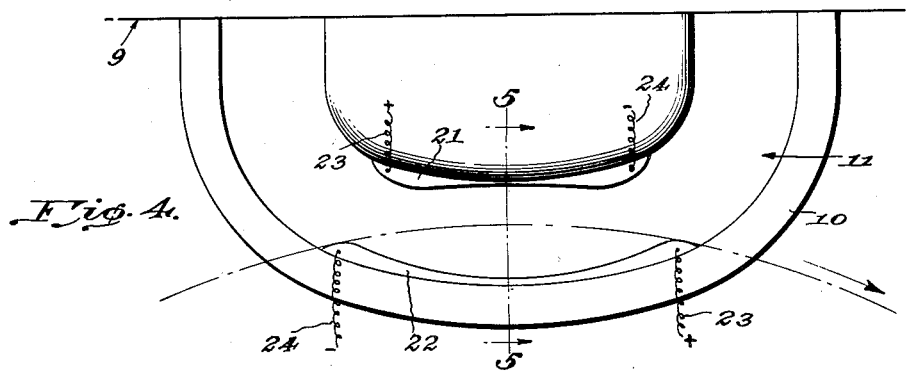
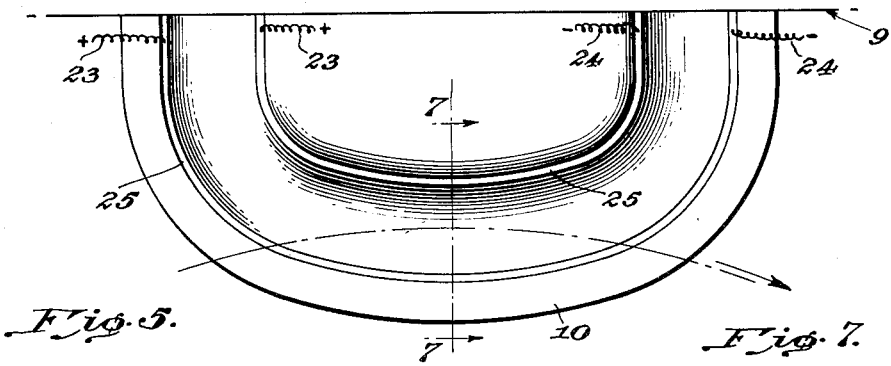
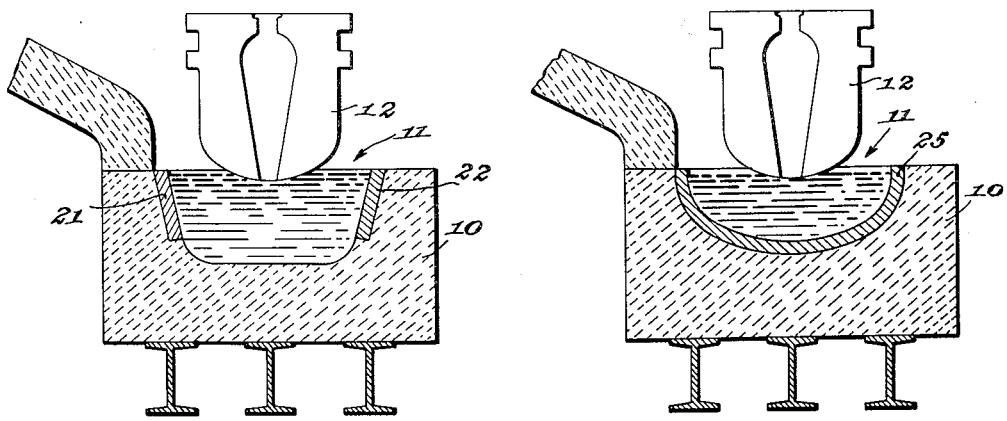
INVENTOR.
*L. D. Soubier*
BY *Rule & Hope*
ATTORNEYS.

Nov. 7, 1939.  L. D. SOUBIER  2,179,224
ELECTRIC HEATING AND FLOW CONTROL OF MOLTEN GLASS
Filed May 18, 1937  3 Sheets-Sheet 3
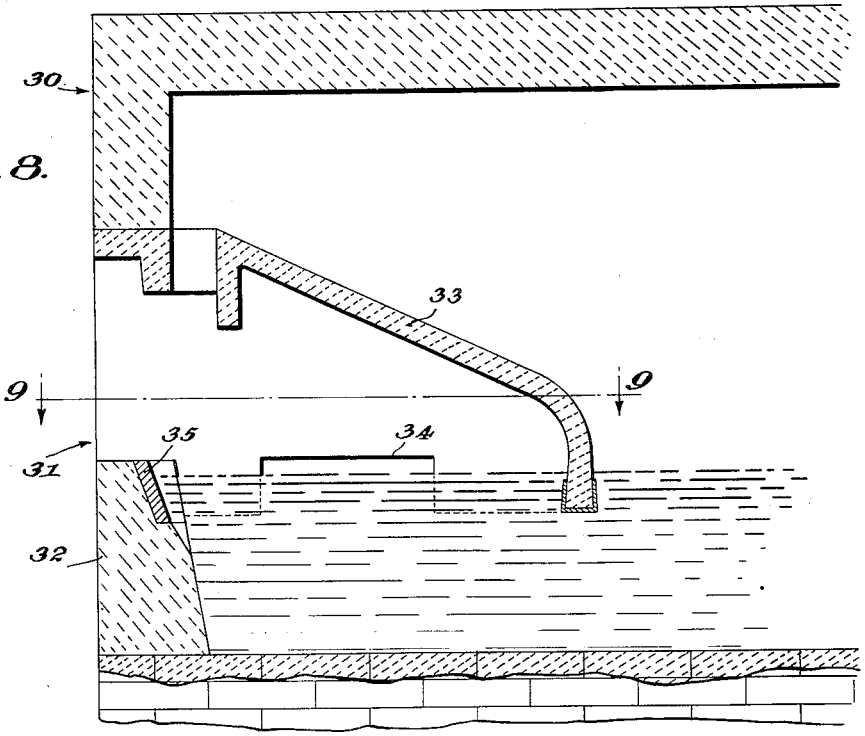
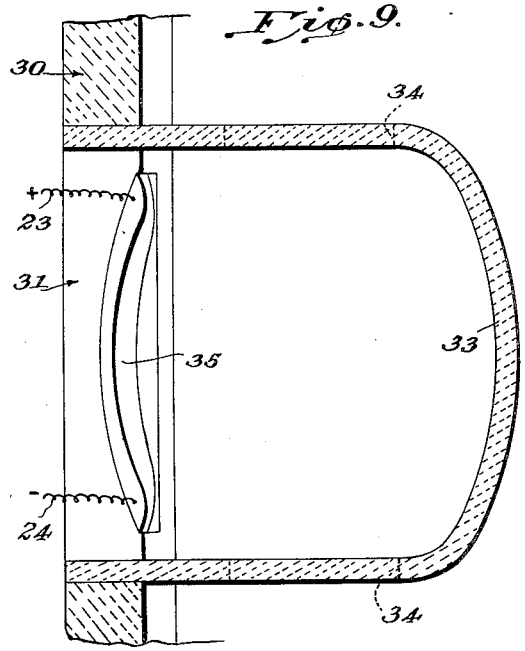
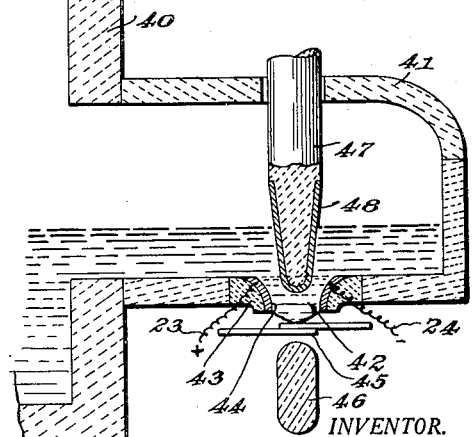
INVENTOR.
L. D. Soubier,
BY
ATTORNEYS.

Patented Nov. 7, 1939

2,179,224

UNITED STATES PATENT OFFICE 2,179,224

ELECTRIC HEATING AND FLOW CONTROL OF MOLTEN GLASS

Leonard D. Soubier, Toledo, Ohio, assignor to Owens-Illinois Glass Company, a corporation of Ohio Application May 18, 1937, Serial No. 143,320

1 Claim. (Cl. 219—38)

My invention relates to apparatus for use in connection with gathering troughs or channels in which molten glass is caused to flow through a gathering zone at which mold charges are removed as by means of suction gathering molds. In conventional forms of such gathering troughs, considerable difficulty is found in controlling the temperature of the glass at the gathering area and in maintaining an adequate and uniform flow of the glass.

Among the objects of my invention are to provide suitable means for raising the temperature of the glass flowing through the channel, maintain an even temperature at the gathering area, regulate and control the temperature to suit varying conditions met with in practice, facilitate the flow of the glass through the channel, and prevent the accumulation or formation of dog metal or cold glass in the channel. The invention is adapted for use with troughs or channels from which charges of glass are drawn by suction molds which dip into the glass and move forward along the channel while in dip and while the charges of glass are being drawn into the mold cavity.

In accordance with my invention, the floor and walls of the channel may be lined in whole or in part with a suitable metal or alloy which is highly resistant to the action of the molten glass, and which may be connected in an electric circuit and function as an electrical resistor. This resistor may be heated by the electric current to a sufficiently high degree to supply heat in regulated amounts to the flowing glass for raising its temperature and maintaining it at the desired working temperature. The electrically heated metal lining, moreover, reduces the resistance to the flow of glass, due in part to the more fluent condition of the glass, and in part to the smoothness of the metal surface as compared with the usual refractory walls.

A feature of the invention consists in facilitating the flow of the glass through the trough by reducing the resistance to the flow to such extent that the circulation may readily be maintained by the movement of the gathering molds themselves, thereby avoiding the need of additional or extraneous means to maintain the circulation.

A further feature of the invention relates to the reduction of the size or cross-sectional area of the trough or body of glass flowing therethrough, with a consequent increase in the rate at which the glass flows, which is of material aid in quickly and reliably filling the molds when suction is applied thereto.

Other objects of the invention will appear hereinafter.

Referring to the accompanying drawings:

Fig. 4 is a plan view of a further modification;

Fig. 5 is a sectional elevation at the line 5—5 on Fig. 4;

Fig. 6 is a plan view of another modification;

Fig. 7 is a sectional elevation at the line 7—7 on Fig. 6;

Fig. 8 is a sectional elevation showing a forebay designed for use with a ram type of suction gathering machine;

Fig. 9 is a section at the line 9—9 on Fig. 8; and

Fig. 10 is a sectional elevation showing a forehearth of the gob feeder type for delivering mold charges by gravity through a bottom outlet.

Figure 1:
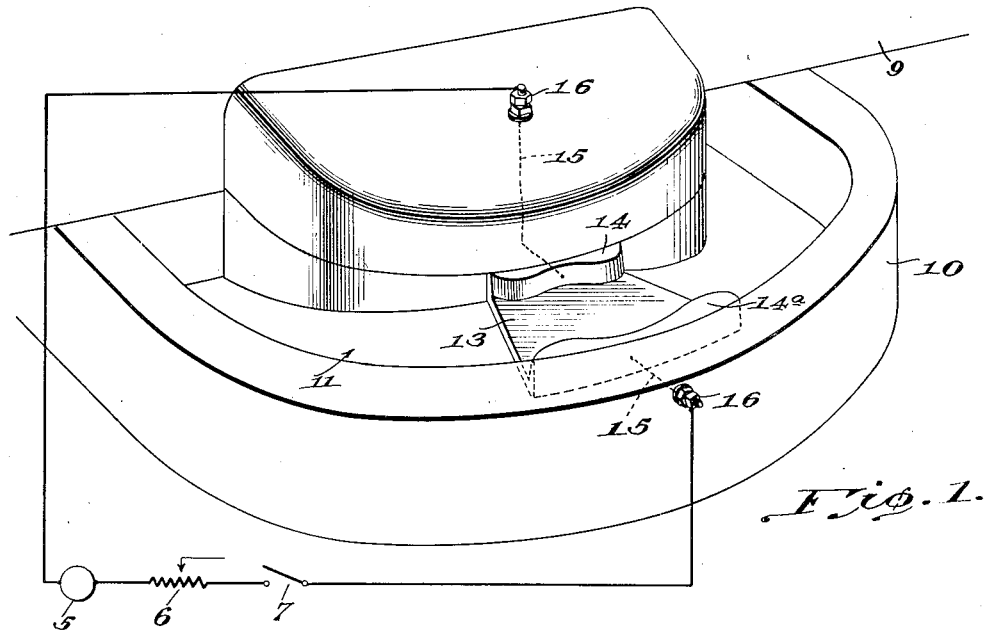
Fig. 1 is a diagrammatic perspective view showing a forehearth or extension of a glass melting and refining tank, providing a trough through which the glass circulates past a gathering area.
Figure 2:
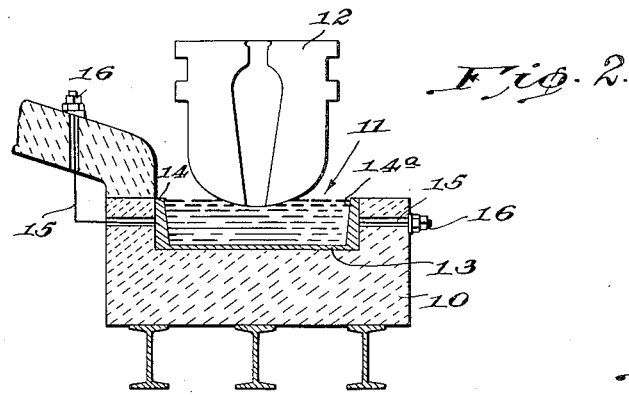
Fig. 2 is a sectional elevation of the same.

Referring particularly to Figs. 1 and 2, a forehearth 10 at the front of a glass melting and refining furnace 9, is formed with a channel 11, in and through which a continuous flow of glass is maintained. Suction gathering molds 12, which may travel continuously in a closed circular path, are periodically brought over the trough 11, lowered into dip as shown in Fig. 2, and advance along the trough while in contact with the flowing glass. While the mold is in dip, suction is applied to exhaust the air from the mold cavity and cause a charge of glass to be drawn in and fill the mold, after which the mold is lifted and the tail of glass uniting the mold with the supply body is severed, all of which is common practice in the art.

In accordance with the present invention, I provide a lining 13 for the floor of the channel 11 which may be of greater or less extent, but which, as shown, is substantially coextensive with the gathering zone. The lining 13 which functions as an electrical resistor in the manner hereinafter described, may be made of platinum, a platinum alloy or other metal or alloy which will withstand the high temperature to which it is subjected and which is highly resistant to the chemical and physical action of the molten glass flowing in contact therewith. I have found that a platinum rhodium alloy is well suited for this purpose. The edges of the lining 13 are extended upward along the side walls of the channel, said extensions forming electrodes or terminals 14 and 14ª to which electrical conductors 15 are attached, said conductors having terminals 16 at which they are connected in circuit with an electric generator 5 or other suitable source of electric current supply. The amount of current caused to flow through the resistor 13 may be adjustably varied by any conventional or approved method, as for example, by means of a rheostat 6 in the line circuit. A switch 7 is also provided in the line circuit.

In operation a stream of glass is caused to flow continuously through the channel 11. The molds 12 traverse the gathering zone in succession at short intervals, each mold as it reaches the gathering zone being lowered into dip and retained in contact with the glass while it traverses the gathering area. While in dip the molds gather the charges of glass by suction. They are then lifted above the level of the glass and the string or tail of glass extending from the mold cavity and uniting the mold charge with the body of glass in the channel, is severed in the usual way by a knife which shears across the lower end of the mold, permitting the tail of glass to fall back into the channel.

In accordance with my invention, the plate 13 which functions as an electrical resistor, is heated by the electric current to a high temperature, usually above that of the glass in the channel so that heat is imparted to the glass. This serves to counteract the cooling action due to the exposure of the glass in the channel to the atmosphere and provides a practical means to regulate the temperature of the glass, maintaining it at the working temperature best suited for the particular mold which is being used and article which is being produced. The electrical heating plate 13, moreover, protects the flowing glass from the chilling action of the floor and side walls of the channel and prevents the formation and accumulation of cold glass or dog metal in the channel. Furthermore, the hot plate 13 maintains the glass in immediate contact therewith at a sufficiently high temperature and in such fluent condition that the frictional resistance to the flow is reduced to a minimum and practically eliminated. The metal plate also provides a smooth surface which offers but little resistance to the flow of glass as compared with the usual refractory material comprising such channels or troughs.

The reduction of the frictional resistance to the flow of glass in the manner above described not only serves to prevent stagnation and chilling of the glass but materially aids in the maintenance of an adequate circulation of the glass through the trough. This permits the molds themselves to act as an effective means for propelling the glass, thereby making it unnecessary to use supplemental propelling devices. Further, by reducing the resistance to the flow in the manner indicated, the glass is caused to move at a higher speed and this permits a reduction in the size or cross-sectional area of the channel and the body of glass flowing therethrough, which in turn results in further increasing the speed at which the glass moves through the gathering zone. The speed of the glass can in this manner be made to approximate the speed of the mold traveling in contact therewith. In other words, the relative speed of the glass and mold is reduced, which facilitates the suction gathering operation, overcoming any tendency of air bubbles to be drawn into the mold and trapped in the glass, and insuring the mold cavity being completely filled.

It will be observed that the size or cross-sectional area of the channel at the gathering zone is substantially reduced by the heating plate 13 and the end walls 14 and 14ª which results in a corresponding acceleration of the flow through said zone. The wall 14 as shown in Fig. 1, is given a concave form or outline to correspond with the arc through which the mold travels through the gathering zone.

Figure 3:
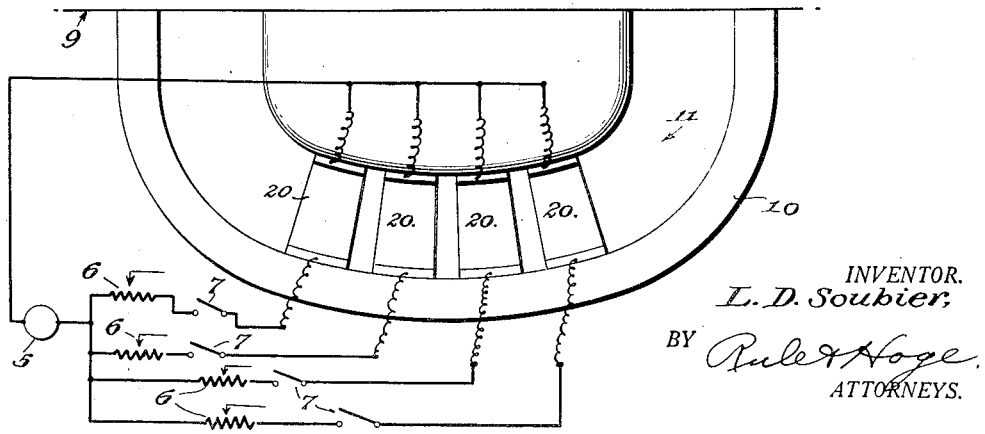
Fig. 3 is a plan view showing a modified construction.

Fig. 3 illustrates a modified form of heating means. As here shown, a plurality of individual resistors or heating plates 20 are arranged within the channel 11 and spaced at intervals. The group of plates may extend from one end to the other of the gathering zone or farther, if desired. Each plate 20 is separately connected in an electrical circuit, and as shown they are connected in parallel in the line circuit of the generator 5. Rheostats or variable resistances 6 and switches 7 individual to the plates 20, are connected in circuit therewith. This arrangement permits the plates to be separately and selectively heated and the temperature of each plate adjustably regulated independently of the others. In this manner, the temperature of the glass may be regulably controlled and adjusted to suit varying conditions met with in practice. For example the plates at the right hand end of the trough may be regulated to give an extremely high temperature zone into which the cutoff portions may be dropped, thus assimilating these chilled cut portions prior to their flowing back into the furnace and insuring the prevention of a seedy condition in the furnace.

Figs. 4 and 5 illustrate a further modification in which electrical heating plates 21 and 22 are arranged to extend along the inner and outer walls respectively of the channel 11. Each of these plates is provided with positive and negative terminal wires 23 and 24 respectively for connecting the plates in an electric circuit. The thickness or cross-sectional area of each plate may be varied at different points lengthwise of the plate in order to regulate the amount of heat supplied at different points. Thus by making these plates comparatively thin at the central portions, as indicated in Fig. 4, the heat supplied by the electric current is largely concentrated at the central portion of the trough. Instead of connecting the heating plates 21 and 22 in the electric circuit or circuits to act as resistors, they may be connected as electrodes in a single circuit, utilizing the electrical conductivity of the glass therebetween for completing the circuit. With this arrangement the heat supplied to the glass within the channel is generated directly within the body of glass itself by the resistance of the glass to the current flow therethrough.

Figs. 6 and 7 illustrate a construction in which the entire floor and side walls of the channel are lined with an electrical conductor 25 which, as shown, is made in a single piece and is itself in the form of a trough. This trough is connected in the electric circuit of the generator 5 by means of the positive wires 23 and negative wires 24 attached to the trough adjacent its opposite ends respectively. The thickness of the walls of the channel 25 may be varied at different points along the channel to correspondingly vary the amount of heat generated. Thus it is sometimes desirable to concentrate the heat within the gathering zone for reasons above indicated. It is also sometimes desirable to supply additional heat along the return section of the channel to aid in the reheating and melting of the chilled tails of glass severed from the mold charges and also to counteract the chilling effect of the air on the glass, as well as the chilling due to the contact with the comparatively cold molds, and to facilitate the flow of glass back into the tank 9. Evidently the thickness of the metal walls of the channel will be reduced where it is desired to concentrate the heat supplied by the electric current.

Figs. 8 and 9 illustrate a furnace construction particularly adapted for use with a suction gathering machine of the ram type. As here shown, the furnace or refining tank 30 is provided with an opening 31 in the front wall 32 thereof. This opening permits the entrance of a ram or the like carrying a suction gathering mold, so that the mold may be brought into contact with the molten glass and gather its charge by suction. The gathering zone is partly surrounded and enclosed by a boot or hood 33 arranged over the gathering area and having its walls extending downward below the level of the glass in the tank. Openings 34 in the side walls of the boot, permit a circulation of glass past the gathering area, which circulation may be maintained by the movement of the molds while in dip. An electrical heating plate 35 is at least partly immersed within the glass and is connected in the electric circuit for heating the glass along the rim of the gathering pot or furnace. It will be noted that in this instance the heat is supplied to that portion of the glass where there is the greatest exposure to the chilling effect of the outside air. Also the heating plate 35 is of different thickness or cross-sectional area at different points lengthwise thereof, being designed to localize the heating effect where it is most needed. As shown, the plate is comparatively thin along the central portion thereof, thereby concentrating the heat where the chilling effect is greatest. This results in maintaining a comparatively even temperature throughout the gathering zone.

Fig. 10 illustrates a construction embodying the present invention as adapted to a gravity type of glass feeder in which the glass flows through a bottom outlet in the feeder and is severed into mold charges. As here shown, the furnace tank 40 is provided with a forehearth extension or boot 41 having a bottom outlet opening 42 through which the glass issues. The opening is formed in a refractory bushing 43 in which is fitted an annulus 44 which lines the bushing. This annulus which functions as an electrical resistor, may be made of a platinum-rhodium alloy or other suitable conducting material such as heretofore described. The resistor 44 is connected in an electric circuit by means of the conductors 23 and 24.

The current flow through the annulus 44 maintains it at a high temperature, preferably above that of the molten glass, so that the glass issuing from the outlet and flowing in contact with the surface of said annulus, is in a highly fluent condition. This permits a ready flow of the glass through the outlet in a stream or column which retains substantially the full diameter of the outlet. The issuing column of glass is periodically severed by a pair of shears 45, thereby forming individual gobs or mold charges 46. A refractory plug or plunger 47 projects downward through the boot with its lower end projecting into the outlet opening. This plug may be stationary but adjustable up and down to regulate the rate of flow of the glass through the outlet. In some instances it may be desirable to reciprocate the plunger up and down in synchronism with the shearing operations to assist in controlling the flow and shaping the gob, in keeping with standard practice. My invention, however, provides a means for causing a free flow of glass in a manner to rapidly produce well formed gobs or mold charges without the necessity of a reciprocating plunger control. The lower end of the plunger 47 is preferably lined or provided with a cover cap 48 made of platinum, platinum-rhodium alloy or the like. This lining material permits a free flow of the glass over the surface thereof. In other words, the glass does not adhere thereto in a manner to interfere with its discharge through the outlet. The lining 48 may be electrically heated, if desired, thereby supplementing the electrically heated annulus 44 in its control of the temperature, flow and shaping of the charges of glass.

Modifications other than those herein shown may be resorted to within the spirit and scope of my invention.

I claim:

Means for regulating and controlling the temperature of molten glass as it flows through a predetermined length of a channel, said means comprising an electrical resistor immersed in the glass in the channel, said resistor being in the form of a sheet metal plate comprising the floor and side wall portions of said predetermined length of the channel, said resistor being connected in circuit with a source of electrical current supply and having portions of varying thickness at different points lengthwise of the channel, whereby the electrical resistance is variable along said resistor so that a variable amount of heat is supplied to the flowing glass at different points along said resistor.

LEONARD D. SOUBIER.